Patented Oct. 20, 1936

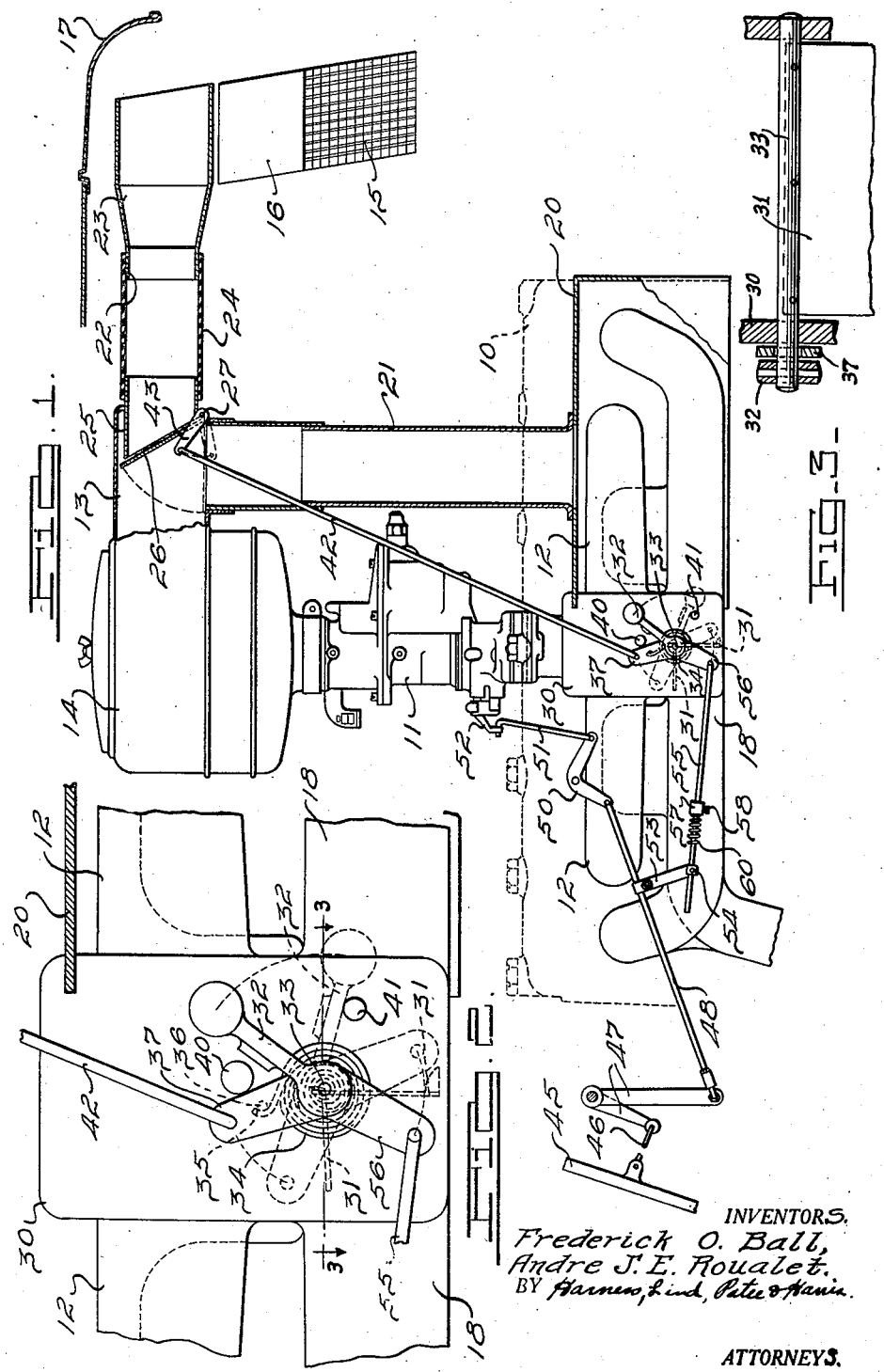

2,058,204

UNITED STATES PATENT OFFICE 2,058,204

INTERNAL COMBUSTION ENGINE

Frederick O. Ball and Andre J. E. Roualet, Detroit, Mich., assignors to Chrysler Corporation, Detroit, Mich., a corporation of Delaware Application January 18, 1934, Serial No. 707,074

20 Claims. (Cl. 123—122)

This invention relates to internal combustion engines and more especially to heating means for the intake manifold of an internal combustion engine and for the air intake passage of fuel vaporizing means for such engine. The invention further relates to the control of the heat supplied to the intake passages of the engine and fuel vaporizing means therefor and to the control of the ratio of cold to warm air delivered to the fuel vaporizing means for such engine.

The principal object of the invention is to improve the operation of internal combustion engines.

Another object of the invention is to control the heating of fuel air and fuel mixture in accordance with different operating conditions of an internal combustion engine.

A further object of the invention is to interrelate the control of the operation of a hot spot heater for the intake manifold of an internal combustion engine and of a hot and cold air supply means for the fuel vaporizing mechanism for such engine.

A still further object of the invention is to provide means for controlling the temperatures of air delivered to the fuel vaporizing means independently of the inter-related control of the intake manifold hot spot heating device and the air supply means for open throttle or near open throttle operation of the engine.

Another object is to provide means for controlling the ratio of cold to warm air delivered to the fuel vaporizing means of an internal combustion engine independently of the inter-related control of the intake manifold heater and of the air supply heater, for high speed operation of the automotive vehicle.

Other objects and advantages will become apparent from the following description and appended claims.

The invention involves the provision of a hot spot heating device for the intake manifold of an internal combustion engine, which device is provided with a control valve for regulating amount of heat supplied to such intake manifold, and of an air supply mechanism provided with a control valve for regulating the relative amount of hot and cold air supplied to the fuel vaporizing or carbureting means for the internal combustion engine, the valve being connected to a thermostatic control element and a loose lever construction which permits the hot spot valve to move to its heat decreasing position before the air control valve moves to its heat decreasing position upon increasing temperatures of the internal combustion engine incident to its operation. The invention further involves the provision of a connection between the throttle control mechanism and the temperature control apparatus so that the air control valve is automatically moved to its heat decreasing position when the throttle control mechanism is open beyond a predetermined degree. Another feature of the invention is a cold air supply means so arranged that air velocity incident to high speed operation of the automotive vehicle will move the air control valve so as to increase the amount of cold air supplied to the fuel vaporizing means for such engine.

For the purpose of illustrating the genus of the invention, a typical concrete embodiment of fuel air and fuel mixture heating means and control mechanism therefor is shown as applied to an internal combustion engine of an automotive vehicle.

In the drawing:

Figure 1 is a side elevation, with parts broken away and in section, of a fuel supply system and heating means therefor as applied to the internal combustion engine of an automobile;

Fig. 2 is a similar enlarged detail of parts shown in Fig. 1; and

Fig. 3 is a horizontal sectional view taken on line 3—3 of Fig. 2.

Referring to the drawing, the numeral 10 indicates an internal combustion engine provided with a fuel vaporizing or carbureting means 11 communicating with the engine 10 through an intake manifold 12, the carbureting means being provided with an air intake 13. An air cleaner 14 is preferably interposed in the air intake 13. The numeral 15 indicates the radiator of the water cooling system for the internal combustion engine 10, the radiator being provided with a radiator tank 16, the radiator tank and radiator being disposed in a shell 17. The engine 10 is provided with an exhaust manifold 18.

A hot air stove 20 is disposed at least partially about a portion of the exhaust manifold 18 so as to be heated by the exhaust gases passing through the latter and is adapted to heat air which is conveyed through the conduit 21 to the air intake 13 of the carbureting means 11. A cold air intake passage indicated generally at 22 comprises an intake conduit 23 mounted on the radiator tank 16, a connecting tube 24 of rubber or other suitable flexible material and a conduit 25 leading into the air intake 13. A swingable valve 26 is fixed to a shaft 27 journaled for rotation on the air intake 13 and is adapted to close the cold air intake passage 22 as indicated in the full line position in Fig. 1 and may be swung to the dotted line position indicated in this figure to open the cold air intake passage 22 and to close the warm air intake passage 21 as indicated by the dotted line position of the valve in Fig. 1.

The exhaust manifold 18 is provided with a hot spot chamber 30, preferably formed integral with the exhaust manifold and arranged in offset position with respect to the latter so as to enclose that portion of the intake manifold 12 which lies between the carbureting means 11 and the remainder of the intake manifold. A hot spot control valve 31 is swingably mounted within the hot spot chamber 30 so that when swung to vertical position it extends across the longitudinally extending passage of the exhaust manifold 18 so as to bypass exhaust gases of the forward portion of such exhaust manifold around the valve 31 and through the chamber 30. The valve 31 may be swung to a horizontal position as indicated in dotted line in Fig. 1 to open up the longitudinally extending passage of the exhaust manifold 18 to decrease the amount of exhaust gases which will flow into and out of the hot spot chamber 30. The hot spot control valve 31 and a weighted lever 32 are both fixed to a shaft 33 journaled for rotation on the exhaust manifold 18 so that the weighted lever 32 always tends to swing the valve 31 to the horizontal position indicated in Figs. 1 and 2 to decrease the flow of exhaust gases through the hot spot chamber 30 and decrease the amount of heat transferred from the exhaust manifold 18 to the intake manifold 12. A thermostatic control element 34 is coiled about the shaft 33 with the inner end fixed thereto and the outer end 35 being of hook-like formation to engage a pin 36 provided on a lever 37 which is loosely mounted for free rotation on the shaft 33. The thermostatic element 34 is mounted adjacent a wall of the hot spot chamber 30 so as to be heated thereby. With the thermostatic element 34 in a cold condition, it contracts in length and the hook-shaped end 35 engages the pin 36 resiliently to maintain the lever 37 in engagement with a fixed stop 40 projecting from the wall of the hot spot chamber 30. The thermostatic element 34 in cold condition acts as a spring and the inner end of this element exerts a biasing action upon the shaft 33 serving to rotate the same in a counterclockwise direction as viewed in the figures of the drawing to maintain the weighted lever 32 in engagement with the stop 40. The thermostatic element 34 when cold will overcome the action of the weighted lever 32 serving to open the valve 31 and will maintain this valve in the vertical position in which exhaust gases are bypassed around the hot spot valve and caused to pass through the hot spot chamber 30.

As the thermostatic element 34 is heated by the hot spot chamber 30 it elongates until the weighted lever 32 can overcome its biasing action and rotate the valve 31 in a clockwise direction, as viewed in the drawing, and swing the hot spot valve 31 from a vertical to the horizontal position indicated. When the lever 32 is swung from the full line position to the dotted line position indicated in Figs. 1 and 2, the lever 32 engages a fixed stop 41 extending from the hot spot chamber 30 and the hot spot 31 is swung from the vertical to the horizontal position. Further elongation of the thermostatic element 34 will cause the hook-shaped end 35 to move in a counter-clockwise direction and permit counter-clockwise rotation of the lever 37. The outer end of the lever 37 is connected by a link 42 to a lever arm 43 fixed to the shaft 27 of the air control valve 26 so that counter-clockwise movement of the hook end 35 of the thermostatic element 34 permits counter-clockwise rotation of the lever 37 and corresponding rotation of the air control valve 26. The air control valve 26 is moved by its own weight, by the weight of the lever 43 and connecting link 42 and also by the pressure of air flowing in a rearward direction through the air intake passage 22.

To form initiating operation of the internal combustion engine 10 from a cold condition, the hot spot valve 31 is closed by the tension of the thermostatic element 34 which also maintains the air control valve 26 in closed position. As the operating temperatures of the engine increase the temperature of the exhaust manifold increases accordingly and exhaust gases flowing through the hot spot chamber 30 increase the temperature of the same and of the intake manifold 12. As the thermostatic element 34 is heated by the hot spot chamber 34 its biasing action decreases and elongation of the element first allows the weighted lever 32 to swing from engagement with the stop 40 to engagement with the stop pin 41. This swings the hot spot valve 31 from the vertical position to the horizontal position which decreases the flow of exhaust gases through the hot spot chamber 30 and reduces the heating of the intake manifold. While the weighted lever 32 is out of contact with and upsupported by the stop 40, it serves to tension the thermostatic element 34 in a clockwise direction to retain the lever 37 in the position shown in Fig. 1 and to hold the valve 26 in its uppermost position until after the valve 31 has been fully opened, thus assuring sequential automatic opening of the valves 26 and 31 in a desired order. Further heating of the thermostatic element 34 further increases its length and decreases its biasing action which permits the valve 26, due to air pressure exerted thereupon and due to the weight of this valve and parts of its operating mechanism, to open. The air control valve 26 upon opening from full line to dotted line position indicated in Fig. 1, opens the cold air intake passage 22 and shuts off the warm air intake passage 21. This reduces the temperature of the air supplied to the carbureting means 11. It is noted that the cold air intake passage 22 leads to the front end of the automotive vehicle so that the forward motion of the vehicle will increase the amount of air supplied to the intake passage 22 to the engine. It is also noted that the air intake passage 22 delivers air directly to the air intake 13 and in increased amounts due both to the greater density of cold air and also to the velocity of the air incident to the forward motion of the vehicle. It is furthermore noted that upon increasing the forward speed of the vehicle still larger amounts of air will be supplied to the carbureting means to provide increased amounts of air for high speed operation of the internal combustion engine 10. The increased amounts of air delivered to the engine increase its efficiency in much the same manner as that effected by supercharging.

A connection is also provided between the throttle control mechanism for the carbureting means 11 of the internal combustion engine 10 and the temperature control apparatus so that the air control valve 26 may be automatically moved to its heat shut-off position when the throttle is opened beyond a predetermined degree. Referring to Fig. 1 of the drawing, the numeral 45 indicates an accelerator pedal connected by a link 46 which is in turn connected to a bell-crank-like lever 47, a link 48, a bell-crank lever 50 and a link 51 to the operating arm 52 of the throttle valve, not shown, of the carbureting means 11. Depression of the accelerator pedal 45 will move the links 46 and 48 generally in a forward direction with respect to the automotive vehicle, causing counter-clockwise rotation of the bell crank levers 47 and 50, and opening the throttle valve of the carbureting means 11. A clip 53 is fixed to the link 48 and is provided at its outer end with a pivoted slide block 54 which encloses a link 55 pivotally connected to an arm 56 of the lever 37. A second slide block 57 is adjustably fixed upon the link 55 by means of a set screw 58 and a spring 60 is arranged upon the link 55 between the slide blocks 54 and 57. Depression of the accelerator pedal 45 will move the link 48 in a generally forward direction with respect to the internal combustion 10, moving the clip 53 in the same direction and bringing the slide block 54 into engagement with the spring 60 after the pedal has been depressed beyond a predetermined point. Further depression of the pedal 45 will move the link 55 in a generally forward direction causing counter-clockwise rotation of the arm 56 of the lever 37 overcoming the biasing action of the thermostatic control element 34 and causing an opening of the air control valve 26. This operation of the air control valve 26 is independent of the thermostatic control element and of the temperature condition of such control element. It will be noted that the accelerator pedal 45 may be depressed up to a certain point without bringing the clip 53 and slide block 54 into contact with the spring 60 so that unless throttle of the carbureting means 11 is brought to wide open or nearly wide open position, the throttle valve operating means will exercise no control over the air control valve 26. The spring 60 cushions the action of the throttle connections to the lever 37 and lessens the chance of breaking the operating connections to the air valve 26. In this manner the depression of the throttle to such a degree that the car will operate at a certain speed, about sixty miles per hour for example, starts to cause the air valve 26 to open the cold air conduit 22 and close the hot air supply. Further depression of the accelerator to such a degree that a car speed of about seventy miles per hour is attained, causes the air valve to completely shut off the hot air supply and fully open the conduit 22. Depression of the accelerator pedal beyond this point merely compresses the spring 60.

It will also be noted that the air control valve 26 may be opened by the pressure head exerted thereon due to the velocity of air flowing rearwardly through the cold air passage 22 when the vehicle is traveling at high speeds in a forward direction. At moderately high speeds, the pressure head exerted upon the air control valve causes it to overcome the biasing action of the thermostatic control element 34 and open at lower temperatures than it would in the absence of the pressure head due to the velocity of the vehicle. Thus at higher forward speeds of the vehicle the volumetric efficiency of the air delivery system is increased both by the greater density of the cooler air delivered to the air intake 13 and by the increased velocity of the air flowing rearwardly through the cold air passage 22.

As many changes could be made in the above constructions and many apparently widely different embodiments of this invention could be effected without departing from the spirit thereof, it is intended that all matter contained in the above description or shown in the accompanying drawing shall be interpreted as illustrative and not in a limiting sense.

What is claimed is:

1. In combination with an internal combustion engine provided with an intake manifold and an exhaust manifold communicating with said engine, fuel supply means communicating with said intake manifold, means for transferring heat from said exhaust manifold to a portion of said intake manifold arranged between said fuel supply means and said engine, means for delivering cold air to said fuel supply means, means for delivering warm air to said fuel supply means, and apparatus for controlling the heat transferred from said exhaust manifold to said intake manifold and the ratio of warm air to cold air delivered to said fuel supply means including an element responsive to increasing temperature of said exhaust manifold and control members articulated with the latter and so constructed and arranged as to initially decrease only the amount of heat transferred from said exhaust manifold to said intake manifold and to subsequently decrease the ratio of warm to cold air delivered to said fuel supply means.

2. In combination with an internal combustion engine provided with an intake manifold and an exhaust manifold communicating with said engine, fuel supply means communicating with said intake manifold, means for transferring heat from said exhaust manifold to a portion of said intake manifold arranged between said fuel supply means and said engine, a valve for controlling the transfer of heat from said exhaust manifold to said intake manifold, means for delivering cold air to said fuel supply means, means for delivering warm air to said fuel supply means, a valve for controlling the relative amounts of cold and warm air delivered to said fuel supply means, and means responsive to increasing temperatures of said exhaust manifold for controlling the operation of both valves first to decrease the amount of heat transferred from said exhaust manifold to said intake manifold and then to decrease the ratio of warm air to cold air supplied to said fuel supply means.

3. In combination with an internal combustion engine provided with an intake manifold and an exhaust manifold communicating with said engine, fuel supply means communicating with said intake manifold, a hot spot chamber communicating with said exhaust manifold and arranged to heat a portion of said intake manifold, a valve for bypassing a portion of the exhaust gases in said exhaust manifold through said hot spot chamber, an air heater arranged adjacent a portion of said exhaust manifold so as to be heated thereby, a cold air conduit communicating with atmosphere and said fuel supply means, a warm air conduit communicating between said air heater and said fuel supply means, and a valve for controlling the relative amount of cold and warm air delivered to said fuel supply means, and means responsive to increasing temperatures of said exhaust manifold for controlling the operation of both valves first to open the first named valve and decrease the amount of exhaust gases passing through said hot spot chamber to decrease the amount of heat supplied by said exhaust manifold to said intake manifold and then to close said second valve across said warm air conduit and open said cold air conduit to decrease the ratio of warm air to cold air delivered to said fuel supply means.

4. In combination with an internal combustion engine provided with an intake manifold and an exhaust manifold communicating with said engine, fuel supply means communicating with said intake manifold and provided with an air intake passage, a hot spot chamber communicating with said exhaust manifold and arranged to heat a portion of said intake manifold, a valve for bypassing a portion of the exhaust gases in said exhaust manifold through said hot spot chamber, an air heater arranged adjacent said exhaust manifold so as to be heated thereby, a cold air conduit communicating between atmosphere and the intake passage of said fuel supply means, a warm air conduit communicating between said air heater and the intake passage of said fuel supply means, a valve arranged in the intake passage of said fuel supply means for controlling the relative amounts of cold and warm air delivered to said fuel supply means, and means including a heat responsive element arranged adjacent said exhaust manifold for controlling the operation of both valves first to decrease the amount of exhaust gases bypassed around said first named valve and to said hot spot chamber and then to move said second named valve across said warm air conduit to close the same and open said cold air conduit to decrease the ratio of warm air to cold air delivered to said fuel supply means.

5. In combination with an internal combustion engine provided with an intake manifold and an exhaust manifold communicating with said engine, fuel supply means communicating with said intake manifold, means for transferring heat from said exhaust manifold to a portion of said intake manifold, means for delivering cold air to said fuel supply means, means for delivering warm air to said fuel supply means, means responsive to increasing temperatures of said exhaust manifold for first decreasing the amount of heat transferred from said exhaust manifold to said intake manifold and then increasing the ratio of warm air to cold air delivered to said fuel supply means, and throttle control means for controlling the delivery of fuel by such fuel supply means to said engine, and means operable by said throttle control means when the throttle valve is opened beyond a predetermined point to open said cold air supply means and shut off the supply of warm air independently of said temperature responsive means.

6. In a vehicle including an internal combustion engine and a fuel vaporizing means for said engine, the combination of means for conducting air to said vaporizing means, an air control valve in said conducting means automatically movable to open position by air pressure for varying the amount of air delivered therethrough, said conducting means being of such character and so positioned that air pressures will build up therein and act on said air control valve so as to open the same and increase the amount of air delivered to said vaporizing means upon high speed operation of the vehicle in a forward direction.

7. In a vehicle including an internal combustion engine and a fuel vaporizing means for said engine, the combination of hot and cold air sources, means for conducting hot and cold air to said vaporizing means, an air control valve in said conducting means automatically movable to open position by air pressure for proportioning the amounts of hot and cold air delivered to said vaporizing means, resilient means normally acting to bias said valve toward a position to decrease the amount of cold air delivered to said vaporizing means, said conducting means being of such character and so positioned as to subject said air control valve to air pressure incident to forward motion of the vehicle, which air pressure is sufficient to overcome the biasing action of said resilient means to move said air control valve to a position to increase the amount of cold air delivered to said vaporizing means when the vehicle is operated at relatively high speeds in a forward direction.

8. In a vehicle including an internal combustion engine and a fuel vaporizing means for said engine, the combination of hot and cold air sources, means for conducting hot and cold air to said vaporizing means, and air control valve in said conducting means for proportioning the amounts of hot and cold air delivered to said vaporizing means, thermostatically responsive means operable at low operating temperatures of said engine for resiliently biasing said valve toward a position to decrease the amount of cold air delivered to said vaporizing means, said conducting means being of such character and so positioned as to subject said air control valve to air pressures incident to forward motion of the vehicle to move said valve to another position against the biasing action of said thermostatically responsive means at a lower operating temperature of said engine than said thermostatically responsive means would otherwise permit and increase the amount of cold air delivered to said vaporizing means when the vehicle is operated at relatively high speeds in a forward direction.

9. In a vehicle including an internal combustion engine and a fuel vaporizing means therefor, the combination of means for conducting air at atmospheric temperature to said vaporizing means, an air heater mounted on said engine so as to be heated thereby, means communicating with said air heater and said first-named air conducting means for conducting heated air to said vaporizing means, an air control valve arranged at the juncture of the two air conducting means for controlling the ratio of air at atmospheric temperature to heated air delivered to said vaporizing means, thermostatically responsive means operable at low operating temperatures of said engine for resiliently biasing said valve to a position across the means for conducting air at atmospheric temperatures to said vaporizing means, said valve and said last mentioned air conducting means being so arranged as to subject said valve to air pressure incident to forward motion of the vehicle to open said valve against the biasing action of said thermostatically responsive element at a lower operating temperature of said engine than said thermostatically responsive means would otherwise permit and increase the amount of air at atmospheric temperature delivered to said vaporizing means when the vehicle is operated at relatively high speeds in a forward direction.

10. In a vehicle including an internal combustion engine and fuel vaporizing means therefor, the combination of hot and cold air sources for said vaporizing means, a valve for proportioning the amounts of hot and cold air supplied to said vaporizing means, an accelerator for controlling the speed of operation of said engine and connected to said valve for controlling the operation of the latter, said valve and cold air source being so arranged as to subject said valve to air pressure incident to forward motion of the vehicle, whereby a sufficiently high speed forward motion of the vehicle causes the valve to decrease the supply of air from the hot air source and increase the supply from the cold air source to said fuel vaporizing means.

11. In a motor vehicle including an internal combustion engine, the combination of a fuel vaporizing means therefor, a cold air source, a hot air source, valve means for proportioning the amounts of cold and hot air supplied to said vaporizing means, fuel mixture heating means, valve means for controlling the heating of fuel mixture by said last named means, means for subjecting said first named valve means to air pressure incident to forward motion of said vehicle, and means for interconnecting said valve means so that both may be moved to cold position by air pressure acting on said first named valve means.

12. In a motor vehicle including an internal combustion engine, the combination of a fuel vaporizing means therefor, a cold air source, a hot air source, valve means for proportioning the amounts of cold and hot air supplied to said vaporizing means, fuel mixture heating means, valve means for controlling the heating of fuel mixture by said last named means, means for subjecting said first named valve means to air pressure incident to forward motion of said vehicle, means interconnecting said valve means so that both may be moved to cold position by air pressure acting on said first named valve means, throttle means for controlling the speed of operation of said engine, and means connecting said throttle means with one of said valve means for controlling the operation of both valve means.

13. In a motor vehicle including an internal combustion engine, the combination of a fuel vaporizing means therefor, a cold air source, a hot air source, valve means for proportioning the amounts of cold and hot air supplied to said vaporizing means, fuel mixture heating means, valve means for controlling the heating of fuel mixture by said last named means, means for interconnecting said valve means, throttle means for controlling the speed of operation of said engine, and means connecting said throttle means with one of said valve means for moving both said valve means to cold position upon a predetermined movement of said throttle means.

14. In a vehicle including an internal combustion engine and a fuel vaporizing means for said engine, the combination of hot and cold air sources, means for conducting hot and cold air to said vaporizing means, an air control valve in said conducting means for proportioning the amounts of hot and cold air delivered to said vaporizing means, thermostatically responsive means for resiliently biasing said valve toward a predetermined position, said conducting means being of such character and so positioned as to subject said air control valve to air pressure incident to forward movement of the vehicle to move said valve to another position against the biasing action of said thermostatically responsive means at a different operating temperature of said engine than said thermostatically responsive means would otherwise permit.

15. In a vehicle including an internal combustion engine provided with an intake manifold and an exhaust manifold communicating with said engine, fuel supply means communicating with said intake manifold, means for transferring heat from said exhaust manifold to a portion of said intake manifold, means for controlling the transfer of heat to said intake manifold, and operating means connected with said heat transfer control means for regulating the latter including an air pressure responsive device operable by air pressure incident to forward movement of said vehicle for varying the heat transfer from said exhaust manifold to said intake manifold.

16. In a motor vehicle including an internal combustion engine, the combination of a fuel vaporizing means therefor, a cold air source, a hot air source, valve means for proportioning the amounts of cold and hot air supplied to said vaporizing means, fuel mixture heating means, valve means for controlling the heating of fuel mixture by said last named means, means responsive to the temperature of said engine for varying the position of said valve, means for subjecting the first named valve means to air pressure incident to forward motion of said vehicle, and means interconnecting said valve means so that both may be moved to cold position independently of said temperature responsive means by air pressure acting on said first named valve means.

17. In a motor vehicle including an internal combustion engine, the combination of a fuel vaporizing means therefor, a cold air source, a hot air source, valve means for proportioning the amounts of cold and hot air supplied to said vaporizing means, fuel mixture heating means, valve means for controlling the heating of fuel mixture by said last named means, means for subjecting said first named valve means to air pressure incident to forward motion of said vehicle, means responsive to the operating temperature of said engine and connected with one of said valve means for varying the position of the latter, means interconnecting said valve means so that both may be moved toward predetermined positions by engine temperature variations and by air pressure acting on said first mentioned valves respectively, throttle means for controlling the speed of operation of said engine, and means connecting said throttle means with one of said valve means for controlling the operation of both valve means.

18. In a motor vehicle including an internal combustion engine, the combination of a fuel vaporizing means therefor, a cold air source, a hot air source, valve means for proportioning the amounts of cold and hot air supplied to said vaporizing means, fuel mixture heating means, valve means for controlling the heating of fuel mixture by said last named means, means for interconnecting said valve means, throttle means for controlling the speed of operation of said engine, means responsive to the temperature of said engine for varying said valve means in accordance with the engine temperature, and means connecting said throttle means with one of said valve means for moving both said valve means to cold position upon a predetermined movement of said throttle means independently of the engine temperature.

19. In an internal combustion engine, a fuel system including a carburetor having a fuel mixture outlet passage and an air inlet, cold and hot air sources communicating with said air inlet, valve means for varying the amount of cold and hot air supplied to said carburetor, means associated with said fuel mixture outlet for heating the mixture discharged therefrom, valve means for controlling the application of heat to said fuel mixture, and automatic regulating mechanism for operating both of said valve means sequentially including a thermostatic element responsive to changes in engine temperature, and including means for conditioning the latter to hold one of said valve means against movement from a predetermined position until after the other valve means has reached a predetermined limit of its range of movement.

20. In an internal combustion engine, a fuel system including a carburetor having a fuel mixture outlet passage and an air inlet, cold and hot air sources communicating with said air inlet, valve means for varying the amount of cold and hot air supplied to said carburetor, means associated with said fuel mixture outlet for heating the mixture discharged therefrom, valve means for controlling the application of heat to said fuel mixture, and automatic regulating mechanism for operating both of said valve means sequentially including a thermostatic element responsive to changes in engine temperature.

FREDERICK O. BALL.
ANDRE J. E. ROUALET.